United States Patent [19]

Byers, Jr.

[11] 3,933,167

[45] Jan. 20, 1976

[54] PILOT OPERATED CHECK VALVE

[75] Inventor: James Otto Byers, Jr., Racine, Wis.

[73] Assignee: Tomco, Inc., Racine, Wis.

[22] Filed: Feb. 20, 1974

[21] Appl. No.: 444,128

[52] U.S. Cl. .................................... 137/106; 91/420

[51] Int. Cl.[2] .................................... F16K 11/18

[58] Field of Search ........................ 137/106; 91/420

[56] References Cited

UNITED STATES PATENTS

| | | | |
|---|---|---|---|
| 2,653,626 | 9/1953 | Finlayson | 91/420 X |
| 3,145,734 | 8/1964 | Lee et al. | 91/420 UX |
| 3,272,085 | 9/1966 | Hajma | 91/420 |
| 3,411,521 | 11/1968 | Johnson | 137/106 |

*Primary Examiner*—Robert G. Nilson

*Attorney, Agent, or Firm*—Ronald E. Barry

[57] ABSTRACT

A pilot operated check valve having pressure actuated poppet valves positioned to limit flow in one direction through each of two flow paths through the valve, each poppet valve including a one-way check valve to control reverse flow through the two flow paths and a spool positioned in said valve and being responsive to inlet pressure in one or the other of the flow paths to open the check valve in the opposite fluid flow path when the pressure differential between inlet pressure and return pressure is within a predetermined ratio.

4 Claims, 4 Drawing Figures

PILOT OPERATED CHECK VALVE

BACKGROUND OF THE INVENTION

Pilot operated check valves are conventionally used to maintain fluid under pressure in a loaded hydraulic motor or cylinder. When pressure is applied to the pilot piston for a pilot operated check valve, a check valve is opened. In order to ensure that maximum system pressure will always open the pilot operated check valve, the area of the pilot piston is several times as large as the area opened by the pilot operated check valve.

SUMMARY OF THE INVENTION

The pilot operated check valve of the present invention provides a means for opening an area equal to the cross sectional area of the pilot piston while still maintaining the high ratio of cylinder port pressure acting to close the check valve to the pilot pressure required to open the check valve.

DRAWINGS

DESCRIPTION OF THE INVENTION

Figure 4:
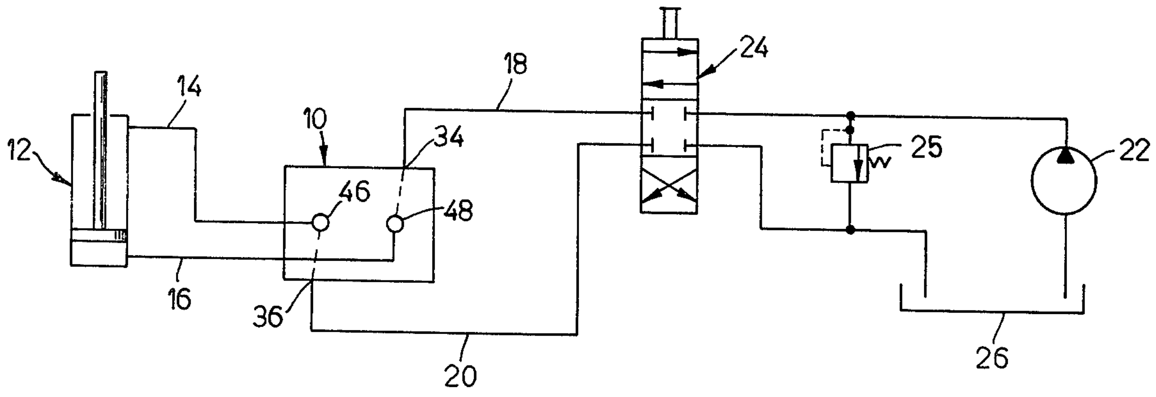
FIG. 4 is a schematic flow diagram of a hydraulic system using the pilot operated valve of the present invention.

The pilot operated check valve 10 of the present invention is used to control the rate of fluid discharge from a hydraulically actuated device 12 in response to inlet fluid pressure. In this regard and referring to FIG. 4, the valve 10 is shown connected to the fluid flow lines 14 and 16 for the hydraulically actuated device 12 which is shown in the form of a piston and cylinder assembly. A pair of fluid pressure lines 18 and 20 are connected to the valve 10 and to a pump 22 and a tank 26 through a selector valve 24. A fluid bypass valve 25 can be provided across lines 18 and 20 to bypass fluid to tank 26.

In the position of the selector valve 24 shown in the drawing, fluid will enter the valve 10 through line 20 and flow to the cylinder assembly 12 through line 14. Fluid discharged from the cylinder assembly 12 will flow through line 16 to the valve 10 and through line 18 to tank 26. If the clinder assembly 12 is under static load, the discharge of the pressurized fluid from the cylinder assembly 12 is prevented until the fluid inlet pressure has reached a fraction of the discharge pressure. This fraction of discharge pressure is determined by the ratio of the cross sectional area of the pilot piston to the pilot operated check valve seat area. In this invention, this fraction is determined by the ratio of the cross sectional area of the pilot piston to the pilot check valve seat area, while the main flow will pass over an area equal to the pilot piston area. In this invention, the pilot piston will force the pilot check valve open. When the pilot check valve opens, the flow from the pressurized cylinder must pass through an orifice in the main poppet valve in order to pass out through the pilot check valve. This will cause a pressure lower than the pressure in the pressurized cylinder to act on the full poppet valve diameter. The higher pressure acting on the smaller area between the poppet valve outside diameter, and the main poppet valve seat diameter will cause the poppet valve to open a seat area equal to or greater than the pilot piston area at a pressure many times lower than the pressure in the pressurized cylinder.

Pilot Operated Check Valve

Figure 1:
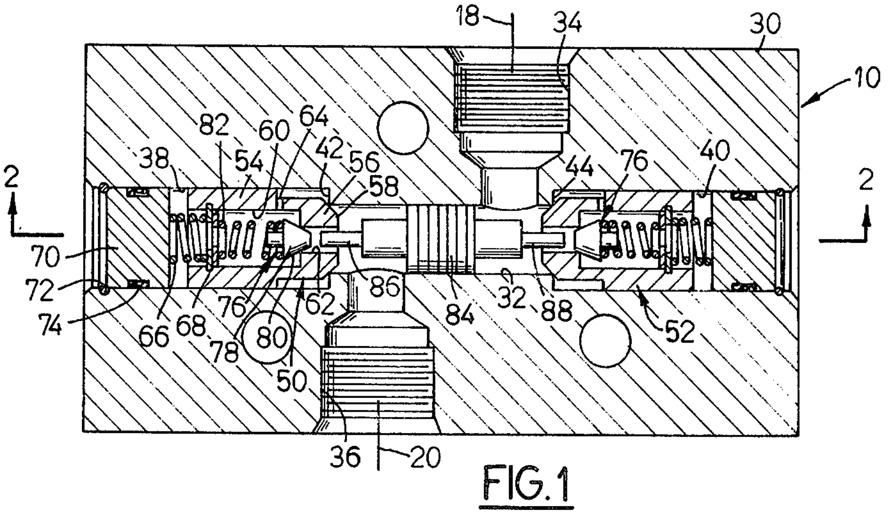
FIG. 1 is a view taken on line 1—1 of FIG. 2 showing the spool in the neutral position in the valve.
Figure 2:
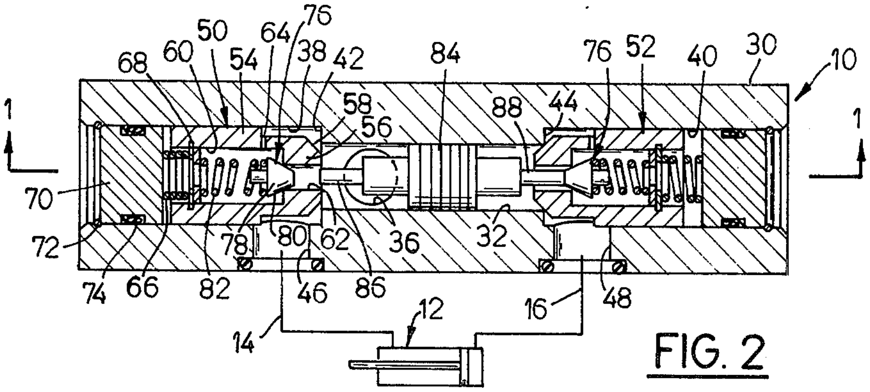
FIG. 2 is a view taken on line 2—2 of FIG. 1 showing the inlet poppet valve in the open position and the spool in a position to open the check valve in the discharge side of the valve.
Figure 3:
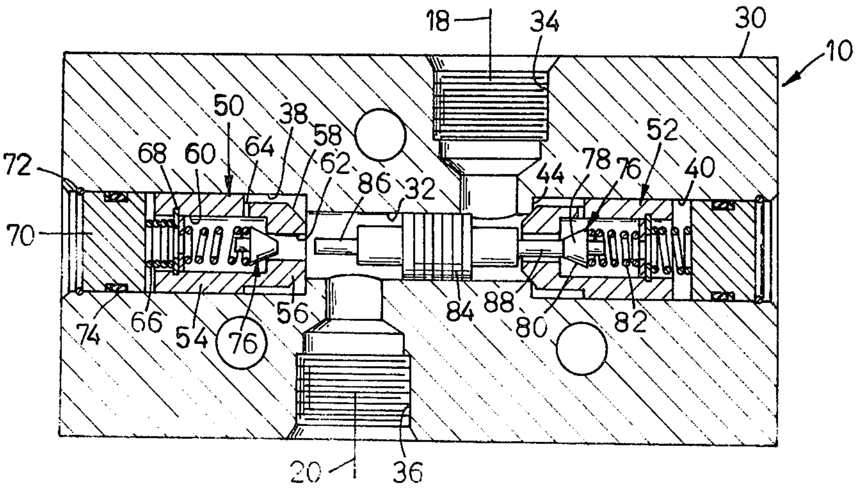
FIG. 3 is a view similar to FIG. 1 showing the inlet poppet valve in the open position and the discharge check valve in the open position.

Referring to FIGS. 1, 2 and 3, the valve 10 includes a valve body 30 having a central bore 32 connected to the fluid pressure lines by means of a pair of fluid inlet passages 34 and 36. Enlarged counterbores or chambers 38 and 40 are provided at each end of the bore 32 in axial alignment therewith, which terminate at shoulders 42 and 44, respectively. The enlarged bores 38 and 40 are connected to the fluid flow lines 14 and 16 by means of fluid pressure ports 46 and 48, respectively.

Means are provided in each of the enlarged counterbores 38 and 40 to prevent fluid from flowing from the ports 46 and 48 to the passages 36 and 34. Such means is in the form of poppet valve assemblies 50 and 52. Each of the poppet valve assemblies 50 and 52 is identical and the following description will refer to the poppet valve assembly in the left side of the valve in counterbore 38, it being understood that the poppet valve 52 in the counterbore 40 is formed from identical parts.

Poppet Valve Assembly

The poppet valve assembly 50 includes a cylindrical valve member 54 having a reduced diameter section 56 positioned for movement into engagement with the shoulder 42. The section 56 includes an annular bevelled edge 58 on the end to sealingly engage the shoulder 42. The valve member 54 includes an axial bore 60 having a reduced diameter discharge port 62 at its inner end which extends through the reduced diameter section 56. A pressure reducing orifice 64 is provided in the reduced diameter section to connect the counterbore 38 to the blind bore 60.

The valve member 54 is biased into sealing engagement with the shoulder 42 by means of a compression spring 66. The spring 66 is positioned between a spring retainer ring 68 located within the blind bore 60 and an end plug 70 positioned in the end of the bore 38. The plug 70 is retained therein by means of a spring ring 72. The plug 70 includes an annular groove in its outer periphery and an O-ring seal 74 which is positioned to sealingly engage the bore 38.

Check Valve Assembly

Return flow from the ports 46 and 48 through the port 62 in the reduced diameter section 56 in the valve members 54 is controlled by means of check valve assemblies 76 located within the valve members 54. Each check valve assembly 76 includes a valve element 78 having a bevel valve seat 80 on its outer periphery and a compression spring 82 positioned between the spring retainer ring 68 and the valve member 78. The valve member 78 is biased by means of the spring 82 into sealing engagement with the periphery of the port 62 to prevent flow from the bore 60 into the bore 32.

Under static load conditions, the poppet valve assembly 50 will be biased to a closed position by means of the spring 66 and the check valve will be biased to a closed position by means of spring 82.

The check valves are opened by means of a spool or piston 84 which is mounted for axial movement in the bore 32 and is located between the passages 34 and 36. The spool 84 includes extensions or rods 86 and 88 at each end which are positioned for movement into the bore 62 in each of the reduced diameter sections 56 of the poppet valves 50 and 52. It should be apparent that on movement of the spool or piston 84 in either direction, one of the rods 86 or 88 will move into engagement with the corresponding check valve member 78. The check valve assembly will be opened if the pressure of the fluid in bore 32 behind the spool 84 is sufficient to overcome the force of the spring 82 plus the pressure in bore 60 acting on the area of bore 62.

In this regard and assuming fluid under pressure is entering the valve through the passage 36, the fluid entering the bore 32 will increase in pressure sufficient to open the right hand check valve assembly 76 as seen in FIG. 3. Fluid can then flow from cylinder 12 through line 16; through port 48; through orifice 64 and across valve element 78 to bore 32. This will allow the pressure in bore 40 to drop, and pressure acting on the differential area of poppet valve 52 between bore 40 and bore 32 will force the poppet valve 52 open. The pressure required to open the poppet valve 52 is normally higher than the pressure required to open the check valve assembly 76. However, when the pressure drops in bore 40, the pressure of the fluid in the space between the reduced diameter section 56 and the bore 40 acting on the poppet valve 52 will be sufficient to overcome spring 66 and open the poppet valve.

If the cylinder 12 is under load, the fluid in the chamber 40 will be under pressure and the spool 84 will not open the check valve assembly 76 until the pressure of the fluid in bore 32 acting on piston 84 is sufficient to overcome both the spring rate of the spring 82 and pressure acting on the cross sectional area of the valve element 78. When the pressure in the bore 32 is sufficient to overcome these forces the spool 84 will open the check valve assembly allowing fluid to flow at a controlled rate through the orifice 64 into the bore 60 of the valve member 54 and through the port 62 into the bore 32 and out through the passage 34.

I claim:

1. A pilot operated check valve comprising:

a valve body having a longitudinally extending bore, a chamber at each end of said longitudinal bore, a pair of fluid flow passages connected to said longitudinal bore, a fluid flow port connected to each of said chambers, a poppet valve in each of said chambers for preventing flow of fluid from said chamber into said longitudinal bore, each poppet valve including a hollow tubular valve member having a reduced diameter section closing one end of said valve member and a spring for continuously biasing said reduced diameter section into sealing engagement with the end of said bore, the cross sectional area of the valve member between the reduced diameter section and the outside diameter of the valve member being exposed to the pressure of the fluid in the flow port, means in said poppet valve for providing restricted fluid flow across said poppet valve, a check valve in each of said valve members to control the flow of fluid from said valve members to said longitudinally extending bore, and a piston positioned in said longitudinal bore between said pair of fluid flow passages, said piston responding to fluid pressure at one end of said bore and including means for opening the check valve at the opposite end of said bore whereby the drop in pressure in the valve member on opening the check valve will allow the pressure of the fluid in the flow port to open the corresponding poppet valve against said bias.

2. The valve according to claim 1 wherein said restricted fluid flow means comprises an orifice in said reduced diameter section for providing fluid communication between said chamber and said valve member.

3. The valve according to claim 1 including a port in said reduced diameter section, said check valve being positioned in said valve member to control the flow of fluid through said port.

4. A pilot operated check valve comprising:

a valve body having a bore, an enlarged counterbore at each end of said bore, a fluid flow passage connected to each end of said bore, a fluid flow port connected to each of said counterbores, a poppet valve in each of said counterbores for providing one-way flow of fluid between the bore and the counterbore, each of said poppet valves including a hollow cylindrical valve member having a reduced diameter section and an opening in the end of said reduced diameter section, the outside of said reduced diameter section being in fluid communication with said port, a spring for continuously biasing said reduced diameter section into seating engagement with said bore, an orifice in said reduced diameter section for providing restricted fluid communication from said port into said valve member, a check valve assembly in each of said valve members to provide restricted one-way fluid flow from said valve member through said opening to said bore, a piston in said bore having an extension at each end in axial alignment with the openings in said valve members and being responsive to fluid pressure in one end of said bore for opening the check valve in the poppet valve at the opposite end of said bore, the valve member responding to the pressure of fluid in the flow port on the outside of said reduced diameter section which overcomes the bias of said first spring to allow for unrestricted flow of fluid from said fluid flow port to said fluid flow passage.

* * * * *